Feb. 24, 1959 R. PYZEL 2,874,950
HYDRAULIC CEMENT PROCESS
Filed March 16, 1954
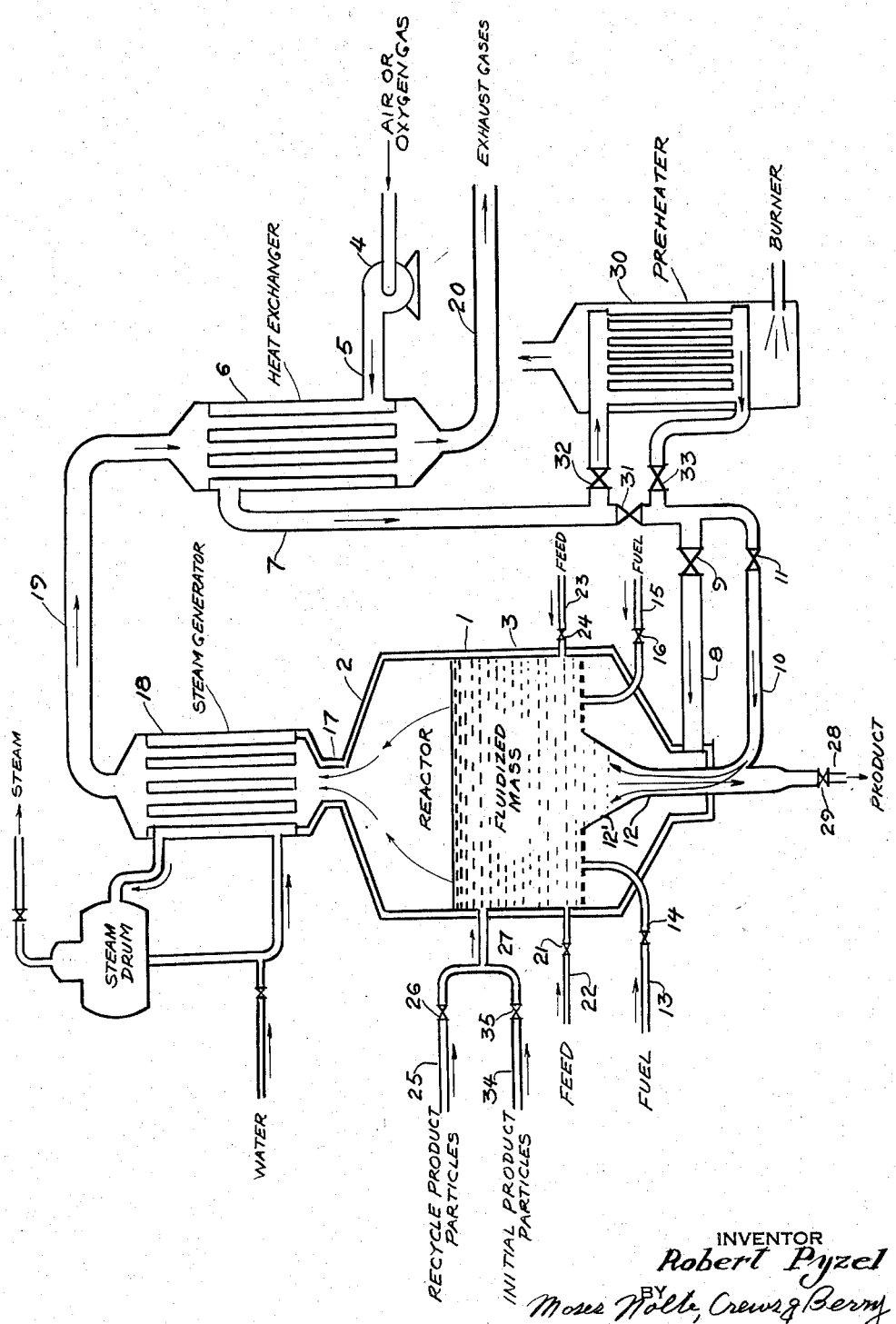
INVENTOR
Robert Pyzel
BY
Moses Nolte, Crews & Berry
ATTORNEY

United States Patent Office

2,874,950
HYDRAULIC CEMENT PROCESS

Robert Pyzel, Piedmont, Calif., assignor to Pyzel-Fitzpatrick, Incorporated, New York, N. Y., a corporation of Delaware Application March 16, 1954, Serial No. 416,603

7 Claims. (Cl. 263—53)

My invention relates to improvements in the art of manufacturing hydraulic cements. Among the particular objectives of my invention are (1) to provide the means for manufacturing cements more economically and (2) to provide the means for producing cements of better quality.

Hydraulic cements may be manufactured from raw materials containing carbonates and/or sulphates, such as calcium carbonate and calcium sulphate, and compounds of silica, alumina, iron oxide, and the like. To convert these materials into hydraulic cement requires that the calcium compounds be converted to calcium oxide by removal of carbon dioxide and/or sulphur dioxide and oxygen, and that the calcium oxide is reacted with the silica, alumina and iron oxide materials to form compounds consisting of combinations such as di-calcium-silicate, tri-calcium-silicate, tri-calcium-aluminate and tetracalcium-alumino-ferrite.

One of the features of my invention is that the cement-forming reactions take place in a mass of fluidized solid particles which is maintained in a reaction zone at temperatures in excess of 2000° F. and in which a controlled and limited amount of reaction occurs relative to the total mass of fluidized material.

Another feature of my invention is that the cement-forming reactions are carried out in such a manner that the formation of "clinkers" or large aggregates of reactant materials is avoided, while the reacting materials are nevertheless permitted to "flux" in order to form the desired cement product.

Another feature of my invention is that the cement forming reactions may be carried out at much longer reaction time factors than those possible in the kilns now used in the cement industry.

Another feature of my invention is that the cement-forming reactions may be carried out at more uniform and, if desired, higher reaction temperatures than those attainable in the kilns now used in the cement industry.

Another feature of my invention is that the product produced by my process is free of alkali compounds.

The combination of these features makes it possible to manufacture cements more economically and of more uniform and better quality, and it provides the means for manufacturing cements of modified or different chemical composition compared to those which can now be produced commercially, and which may have superior or special qualities desirable in various types of construction employing cement.

In accordance with my invention, the feed materials, consisting, for instance, of carbonates or sulphates and oxide materials, may be charged to the process as such or after they have been subjected to pre-treatment to partially or completely convert the carbonates or sulphates in the feed to the corresponding oxides. These feed materials, as such or pre-treated, are first ground to a fine powder, and the fine powder so obtained is then charged into the reaction zone of my process.

The reaction zone of my process consists of a mass of solid particles contained in a suitable vessel and maintained in a fluidized state by upward flow of air or other oxygen carrying gases through the mass. The mass is heated to and maintained at reaction temperatures by injection of fuel into the mass which, by combustion with the oxygen of the fluidizing gases (and the oxygen released by conversion of sulphates, if the latter are present in the feed materials), generates the necessary heat.

The particles contained in the fluidized mass consist almost entirely of cement product material with only a limited amount of reaction of cement forming materials taking place in the fluidized mass, mostly on the surfaces of said cement product particles. The mode of operation of this fluidized mass and the purpose of this operation are outlined in the following paragraphs.

It is necessary to control the molten phase which develops during the course of the cement-forming reactions. This molten phase has heretofore been the principal obstacle to successfully carrying out the cement-forming reactions in a fluidized solids operation, for it causes a "stickiness" which agglomerates the fluidized solid particles into large aggregates and thereby renders the continued operation of the fluidized mass impossible—the fluidized mass rapidly became a stationary body of agglomerated particles.

This molten phase (which is characteristic of the cement-forming reactions, and which is helpful in promoting the progress of these reactions) is caused only by certain intermediate reaction materials, that is, neither the feed materials nor the final cement product can melt at the cement-forming reaction temperatures.

In the operation of my process the molten phase serves its useful purpose while at the same time it is held in check to the point where agglomeration of the fluidized mass is prevented. This is accomplished by initially establishing at the start of the operation, and maintaining during continued operation, a fluidized mass consisting predominantly of relatively coarse particles of cement product material, for instance, of a size ranging from 400 microns upward, and charging into this "stable" mass the feed materials in finely powdered form, for instance, fine enough so that the maximum size is less than 100 microns. Initially, reaction sets in as some of the fine feed particles cling to the surfaces of the product particles and a small amount of molten phase develops on these surfaces causing a degree of "stickiness" which thereafter is sufficient to cause all the fine feed particles to be attached to the surfaces of the larger product particles. Thereby, the cement forming reactions are caused to proceed on these surfaces, causing a gradual growing of the product particles as layer upon layer of new product material is created in this manner. But the amount of reaction taking place on the product particles is limited and controlled, in the manner described below, and hence the amount of molten phase occurring on these surfaces is also limited and controlled. The net effect is that there is sufficient "stickiness" to cause adherence of the fine feed particles to the coarser product particles, but yet the degree of "stickiness" is not sufficient to cause the larger product particles themselves to become attached to one-another, and agglomeration of the fluidized mass is thereby prevented.

To obtain and control the desired degree of "stickiness" in the fluidized mass, it is necessary to select the proper charging rate of finely powdered feed materials relative to the total mass of coarse fluidized product particles maintained in the reaction zone, and this selection of charging rate must be made in relation to the reaction velocities which, in turn, are primarily determined by the temperature level at which the fluidized mass is operated.

It will be apparent that in the operation of the reaction zone disclosed herein the smaller the feed rate relative to the total fluidized mass, the smaller will be the amount of reacting materials dispersed over the surfaces of the product particles in the fluidized mass, and therefore the smaller will be the concentration of molten phase, and hence the "stickiness," which develops on these surfaces. But in addition to this, the concentration of the molten phase on the surfaces of the product particles in the fluidized mass will also be influenced by the operating temperature, the effect being that the higher the temperature the smaller the concentration of molten phase. This may appear contradictory since higher temperatures are usually associated with more melting. In the case of the cement forming reactions, however, the molten phase is not a direct function of the temperature, but is due to the formation of eutectic mixtures, and these melt at any temperature within the range of temperatures in which the cement forming reactions take place. It is therefore the relative amount of eutectic mixtures, not the reaction temperature as such, which determines the concentration of molten phase. These eutectic mixtures are formed only by certain intermediate reaction materials, and one may therefore look upon the cement forming reaction as taking place in two steps—(1) reactions of feed materials into intermediate materials, with some of the latter forming eutectic mixtures which melt, and (2) reactions of intermediate materials into final product, with a disappearance of the molten phase because the eutectic forming intermediate materials are converted into "stable" final product. The concentration of eutectic forming intermediate materials in the system of reactions will depend on the relative velocities of the reactions involved in the first step and those involved in the second step. The reactions making up the second step are the more difficult and require higher temperatures to initiate. If the reaction temperature is not high enough, it is even possible that the first step will take place while the second step does not, with reaction proceeding only to the formation of intermediate materials, and hence a maximum opportunity for the formation of eutectics which will melt even at this lower reaction temperature. Raising the reaction temperature will bring the reactions of the second step into play causing conversion of the intermediate materials into final product, and thereby causing a decrease in the concentration of the intermediate, eutectic forming materials. Thus, the more the reaction velocities of the second step are speeded up relative to the velocities of the reactions of the first step, the lower, the amount of intermediate materials, which in turn lowers the amount of eutectics with a resulting lower concentration of molten phase.

Furthermore, as the reaction temperatures are raised, all the reaction velocities are speeded up generally, so that at higher temperatures the overall conversion of feed materials into final product will be more rapid. Consequently, for any given feed rate (relative to the mass of material in the reactor) the amount of reacting material present in the total fluidized mass will be reduced with increasing operating temperatures, and consequently the amount of molten phase will also be reduced, for this reason as well as, and in addition to, the reason referred to in the preceding paragraph.

The above factors are interrelated, and in the operation of the reaction zone disclosed herein, low feed rates relative to total fluidized mass plus high temperatures lead to low concentration of molten material and hence a low degree of "stickiness," while high feed rates and lower temperatures lead to higher concentration of the molten phase, hence to greater "stickiness." Thus the desired degree of "stickiness" may be obtained and controlled by the proper selection of operating temperature and feed rate in relation to total mass in the reaction zone.

In the operation of the reaction zone disclosed herein, the particles in the fluidized mass will continually grow in size as layer upon layer of new product material is created on the surfaces of the particles, and as a consequence the largest particles (which will have the greatest mass relative to surface) will contain the highest percentage of finished product material, with possibly only a trace of partially reacted material on their surface. It is therefore desirable to withdraw from the fluidized mass, through the discharge tube 12, only the largest particles to be discharged as final product of the operation, since in this manner the final product will contain the minimum, if any, unreacted or partially reacted material. However, when the process is operated with very low feed rates relative to the fluidized mass contained in the reaction zone, and the feed materials are charged as a very fine powder, while at the same time the fluidized mass is operated at high reaction temperatures (in other words, when the process is operated at conditions which bring about a minimum concentration of reacting materials in the total fluidized mass), it may then not be necessary to selectively withdraw only the largest particles as final product inasmuch as the average composition of the fluidized mass may, during operation of the process in this manner, contain so low a percentage of unreacted or partially reacted material that this average composition will meet the desired product specifications. In such case it will be satisfactory to simply withdraw an adequate quantity from the fluidized mass as final product without a specifically controlled segregation of particle sizes.

Since, in the operation of the reaction zone disclosed herein, the particles in the fluidized mass will continually grow in size, there is a tendency toward increasingly coarser particle sizes in the fluidized mass as the operation of the process continues. Even when only the coarsest particles are selectively withdrawn as final product, there will nevertheless be a disappearance of the relatively smaller particle sizes. Therefore, in order to control and maintain the most satisfactory particle size distribution in the fluidized mass during continued operation, it may be desirable to charge into the mass, in addition to the finely powdered feed materials, controlled quantities of product material of somewhat smaller particle size than the average particle size of the fluidized mass. These smaller product particles serve as nuclei for growing into larger particles, and by this procedure the particle size distribution of the fluidized mass may be maintained as desired.

Any alkali materials which are present in the feed materials charged to the process are converted to sodium and potassium oxide in the reaction zone, and these oxides will be vaporized at the operating temperatures. Such oxide vapors are discharged from the fluidized mass and leave the reaction zone in the combustion and other gases. In the process disclosed herein, these discharge gases are purposely not brought in contact with the feed materials (such as might be done in order to exchange heat from these gases to the feed materials) in order to avoid condensation of the alkali oxides in the feed materials. Therefore, a build-up of alkali concentration in the cement forming reaction zone, such as occurs for instance in the kilns now used in the industry, is prevented. In my process the concentration of alkali vapors in the fluidized mass is held to the minimum possible depending on the alkali content of the original feed materials, and as a consequence the cement product produced in this manner contains only a trace of alkalies, if any.

The operation of my process may be further described with reference to the accompanying drawing which diagrammatically illustrates an apparatus suitable for carrying out my invention. It will be apparent to those skilled in the art that alternative equipment to that shown on the drawing may be employed without departing from the essence of my invention. The particular apparatus shown therefore constitutes a preferred form suitable for the purpose but is not intended as a limitation upon the full scope of my invention.

Referring to the drawing, the fluidized mass 1 is maintained in reactor 2 and supported on a suitable grid 3. Reactor 2 may consist of a steel shell internally lined with firebrick and externally insulated. Air or other oxygen containing gases are charged into the fluidized mass by means of compressor 4, the gases flowing from compressor 4 through line 5, then through heat exchanger 6, then through line 7 which divides into lines 8 and 10 which are provided respectively with flow control valves 9 and 11. The gases flowing through line 8 enter the lower portion of the reactor, beneath the grid 3, and pass upwardly through the grid into the fluidized mass, while those flowing through line 10 enter the fluidized mass through a product discharge tube 12. The upper end of the discharge tube 12' is of conical form for reasons hereinafter set forth. Suitable quantities of fuel (gas, oil, powdered coal, or the like) are charged into the fluidized mass through lines 13 and 15, provided respectively with control valves 14 and 16. Combustion of the fuel with the oxygen of the gases entering through lines 8 and 10, and the oxygen which may be generated within the fluidized mass by conversion of sulphates, provides the heat necessary to maintain the fluidized mass at operating temperatures. The combustion and other gases discharging from the top of the fluidized mass flow through a discharge or outlet 17, through steam generator 18, through line 19, through heat exchanger 6, and are discharged from the process through line 20.

The feed materials, ground to a fine powder in equipment not shown, are charged into the fluidized mass through lines 22 and 23 provided with control valves 21 and 24. Recycled product particles for controlling the particle size distribution of the fluidized mass may be charged through line 25, with control valve 26, and line 27.

Product particles are withdrawn from the fluidized mass through the product discharge tube 12 and are discharged from the process through line 28 and valve 29. The product discharge tube 12 operates in the following manner. The gases charged into the tube 12 from line 10 flow upward therethrough and as they pass upwardly through the conical portion 12' of upwardly increasing diameter, the linear velocity is decreased. The fluidized mass immediately above the conical portion 12' will descend into the discharge tube to the section where the gas velocity is sufficient to generally support only the smaller fluidized particles. In this section a segregation will occur, the larger particles continuing on downward since their ratio of mass to superficial surface is high enough so that these larger particles will fall against the rising gas current, while the smaller particles are borne upward by this current and are returned into the fluidized mass. Operating control over the degree and extent of particle separation with any given design of discharge tube may be obtained by varying the gas velocities in the tube by adjustment of the division of the total gas flow between lines 10 and 8. Thus, more gases or less gases may be made to flow upward through the product discharge tube 12 by causing a corresponding lesser or greater flow of gases through the grid 3, the adjustment being obtained by means of valves 9 and 11. The larger particles, which were able to fall against the rising gas stream, collect in the bottom extension of the tube below the gas inlet, from which they may be discharged through line 28 as before mentioned.

The process is placed in operation by charging the air or oxygen carrying gas stream flowing through line 7 through auxiliary gas preheater 30 by closing valve 31 and opening valves 32 and 33. The division of the gas stream between lines 8 and 10 is adjusted to a high flow through line 10. The auxiliary gas preheater 30 is fired. Product particles of a size range corresponding to the average particle size distribution of the fluidized mass during normal operation are then charged into reactor 2 through line 34, valve 35, and line 27, until the desired level of this initial fluidized mass of product particles is obtained. The temperature of this fluidized mass will rise as the preheated gases flow through it, and when the temperature is sufficiently high, for instance in the order of 1000° F., fuel is charged into the fluidized mass which, by combustion with the oxygen in the gases, will raise the temperature to the desired operating level. The auxiliary preheater is then cut out and valve 31 opened while valves 32 and 33 are closed. Charging of feed powder is now started. Product withdrawal is started by adjusting the gas flow rates through lines 8 and 10, as above described. When necessary, recycle product particles are charged, as above described. The operation may be lined out at the desired operating conditions, and the process is on stream.

This application is a continuation-in-part of my prior application Serial No. 264,144 filed December 29, 1951, now abandoned.

Having thus described my invention and the manner in which the operating controls are adjusted to obtain the most desirable performance of the process, what I claim is:

1. A process for the production of hydraulic cement which comprises initially establishing and maintaining a mass of relatively coarse cement product particles in a fluidized state in a reaction zone by upward flow of oxygen carrying gases through said mass, charging fuel into said mass which by combustion with the oxygen generates the heat necessary to maintain said mass at reaction temperature, charging relatively fine particles of cement forming materials into said mass to permit reaction to take place between said fine cement forming particles and accretion of the resulting cement on the surface of said coarse product particles, and selectively withdrawing from said mass only the coarser particles thereof at the point of withdrawal to be discharged as the final product of the process while retaining in said mass the finer particles to subject said finer particles to continued reaction conditions.

2. A process for the production of hydraulic cement which comprises initially establishing and maintaining a mass of relatively coarse cement product particles in a fluidized state in a reaction zone by upward flow of oxygen containing gases through said mass, charging fuel into said mass which by combustion with the oxygen generates the heat necessary to maintain said mass at reaction temperatures, discharging the combustion gases and other gases generated within said mass from said reaction zone, charging relatively fine particles of cement forming materials into said mass without prior contact of said discharged combustion gases and other gases with said cement forming materials, and selectively withdrawing from said mass only the coarser particles thereof at the point of withdrawal to be discharged as the final product of the process while retaining in said mass the finer particles to subject said finer particles to continued reaction conditions.

3. A process for the production of hydraulic cement which comprises initially establishing and maintaining a mass of relatively coarse cement product particles in a fluidized state in a reaction zone by upward flow of oxygen carrying gases through said mass, charging fuel into said mass which by combustion with the oxygen generates the heat necessary to maintain said mass at reaction temperatures, charging relatively fine particles of cement forming materials into said mass to permit reaction to take place between said fine cement forming particles and accretion of the resulting cement on the surface of said coarse cement product particles, charging cement product particles into said mass of a particle size smaller than the average particle size of said mass, and selectively withdrawing from said mass only the coarser particles thereof at the point of withdrawal to be discharged from said reaction zone as the final product of the process while retaining in said mass the finer particles to subject said finer particles to continued reaction conditions.

4. A process for the production of hydraulic cement which comprises initially establishing and maintaining a mass of relatively coarse cement product particles in a fluidized state in a reaction zone by upward flow of gas through said mass, maintaining said mass at the cement-forming reaction temperature, charging relatively fine particles of cement forming materials into said mass to permit reaction to take place between said fine cement forming materials in said mass and accretion of the resulting cement on the surface of said coarse product particles, and selectively withdrawing from said mass only the coarser particles thereof at the point of withdrawal to be discharged as the final product of the process while retaining in said mass the finer particles to subject said finer particles to continued reaction conditions.

5. A process for the production of hydraulic cement which comprises initially establishing and maintaining a mass of relatively coarse cement product particles in a fluidized state in a reaction zone by upward flow of oxygen carrying gases through said mass, charging fuel into said mass which by combustion with the oxygen generates the heat necessary to maintain said mass at reaction temperature, charging relatively fine particles of cement forming materials into said mass to permit reaction to take place between said fine cement forming particles and accretion of the resulting cement on the surface of said coarse product particles, withdrawing a portion of said mass downwardly therefrom through a restricted zone, passing a current of gas upwardly through said restricted zone in contact with and countercurrent to the withdrawn portion of the bed, the velocity of the gas passed upwardly through said restricted zone being sufficient to entrain and carry back into said bed the finer particles thereof but insufficient to entrain and carry back into said bed coarser particles thereof, whereby the coarser particles only are discharged through said restricted zone as the product of the reaction.

6. A process for the production of hydraulic cement as set forth in claim 5 in which the mass of particles is maintained in a fluidized state by the gas introduced upwardly through said restricted withdrawal zone and by gas separately introduced into the lower portion of the mass, and controlling the size of the particles withdrawn through the restricted withdrawal zone by varying the velocity of the air introduced into the mass of particles through the restricted withdrawal zone.

7. A process for the production of hydraulic cement as set forth in claim 6 in which the amount of gas separately introduced into the lower portion of the mass is so correlated with the amount introduced through the restricted withdrawal zone that a substantially constant amount of air is introduced into the mass.

References Cited in the file of this patent

UNITED STATES PATENTS

| | | |
|---|---|---|
| 1,832,226 | Loesche | Nov. 17, 1931 |
| 2,465,410 | White | Mar. 29, 1949 |
| 2,498,710 | Roetheli | Feb. 28, 1950 |
| 2,666,269 | Parry | Jan. 19, 1954 |
| 2,698,171 | Schoenmakers et al. | Dec. 28, 1954 |
| 2,738,182 | Thompson | Mar. 13, 1956 |